May 18, 1965

E. W. ELLIOTT ETAL 3,183,811

DEVICE FOR THREADING FILM

Filed July 24, 1961

INVENTORS.
Eugene W. Elliott,
BY Earl E. Gray,

Byron, Hume, Groen & Clement
ATTYS

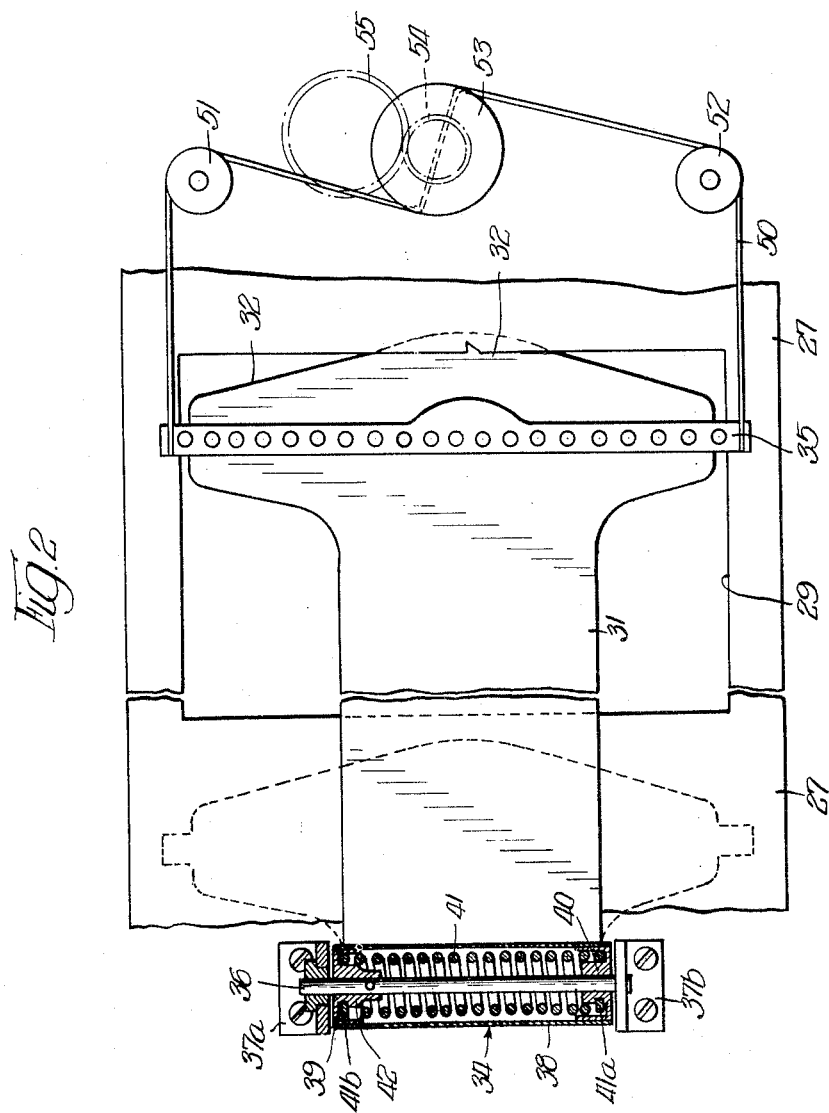

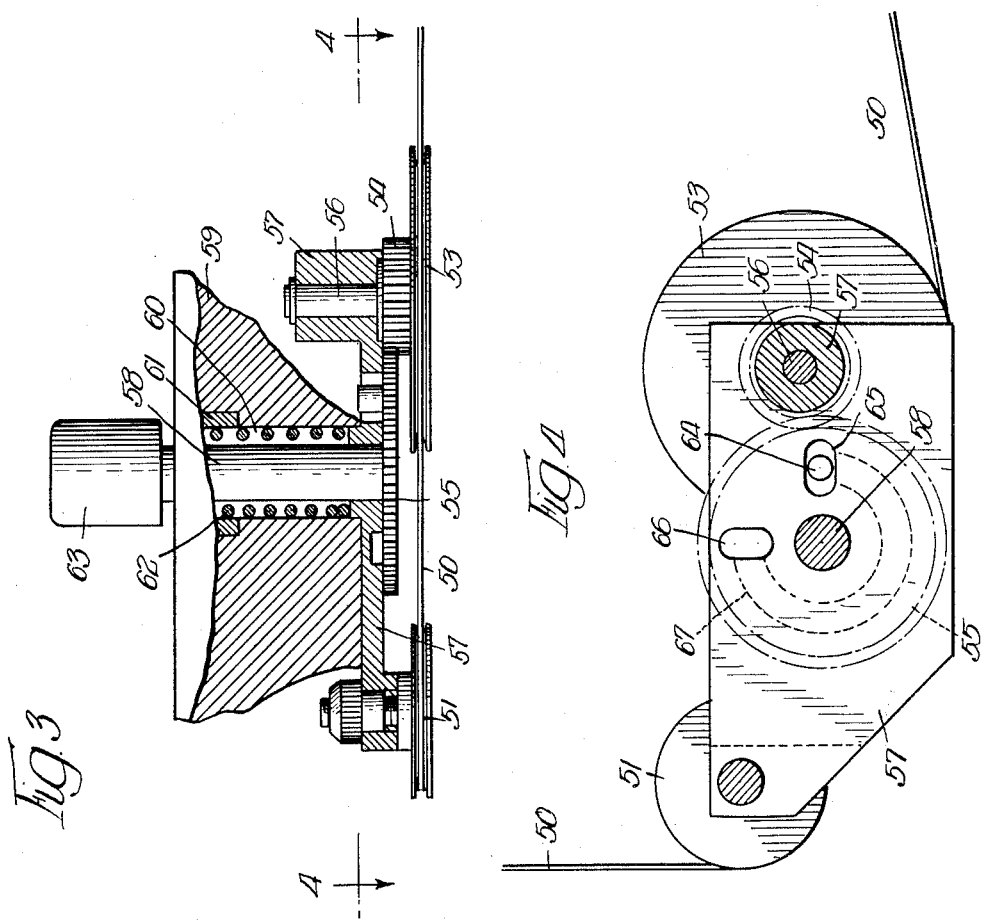

United States Patent Office 3,183,811
Patented May 18, 1965

---

3,183,811
DEVICE FOR THREADING FILM
Eugene W. Elliott, Barrington, and Earl E. Gray, Lombard, Ill., assignors to Chicago Aerial Industries, Inc., Barrington, Ill., a corporation of Delaware
Filed July 24, 1961, Ser. No. 126,036
4 Claims. (Cl. 95—34)

This invention relates generally to improvements in photographic equipment and in particular to improvements in means for threading the film in a cassette type camera.

Reference is made to the co-pending application of Eugene W. Elliott et al., Serial No. 705,317, filed December 26, 1957, now issued as Patent No. 3,049,981 which application discloses a device used to assist those responsible for the threading of film in aerial photographic cameras having removable film cassettes. This invention constitutes an improvement over that shown in the aforementioned co-pending application.

As more fully described in the co-pending application generally aerial cameras employing film cassettes have a relatively large format aperture across which the end of the film must travel when the camera is being threaded with film. Also, this aperture is inaccessible to the operator when the camera lens cone and camera body are assembled. In the co-pending application a guide finger associated with a knob positioned exterior of the camera, has been employed. By manipulating the knob the guide finger is positioned across the format aperture so that the film may be readily threaded across this opening in its path. An additional and unique feature of the co-pending application was the provision of means for rendering the takeup cassette inoperative during intervals in which the guide finger blocked the format aperture.

While the film threading device of the co-pending application fulfilled its functional requirements adequately when employed with cameras using between-the-lens shutters, use of this relatively thick threading device precluded the use of focal plane shutters, which shutters are commonly and necessarily positioned as close to the focal plane as possible.

Therefore, it is an object of this invention to provide an improved film guide means to be used in conjunction with a cassette type camera.

A more particular object of the invention is to provide an improved film guide means that will still permit positioning of a focal plane shutter in close proximity to the focal plane of the camera employed therewith.

A still further object of the invention is to provide an improved film guide means especially adaptable for use with focal plane shutters, which guide means will prevent assembly of the takeup cassette of the camera when the guide means obstructs the format aperture.

Yet another object of the invention is to provide an improved film guide means adapted for use with both focal plane and between-the-lens type aerial camera shutters.

With these and other objects in view, the invention comprises the construction, arrangement and combination of various parts of the film guide means, whereby the objects contemplated are attained as hereinafter set forth. The various features of novelty which characterize this invention are pointed out with particularity in the claims appended to and forming a part of this specification. For a better understanding of the invention and its advantages, reference is made to the accompanying drawing and descriptive matter in which are illustrated and described an illustrative embodiment of the invention.

In the drawings:

FIGURE 2 is a view taken along the lines 2—2 in FIGURE 1.

FIGURE 3 is a fragmentary cross section taken along the lines 3—3 in FIGURE 1 and shows a portion of the mechanism of the invention.

FIGURE 4 is a view taken along the lines 4—4 in FIGURE 3.

Figure 1:
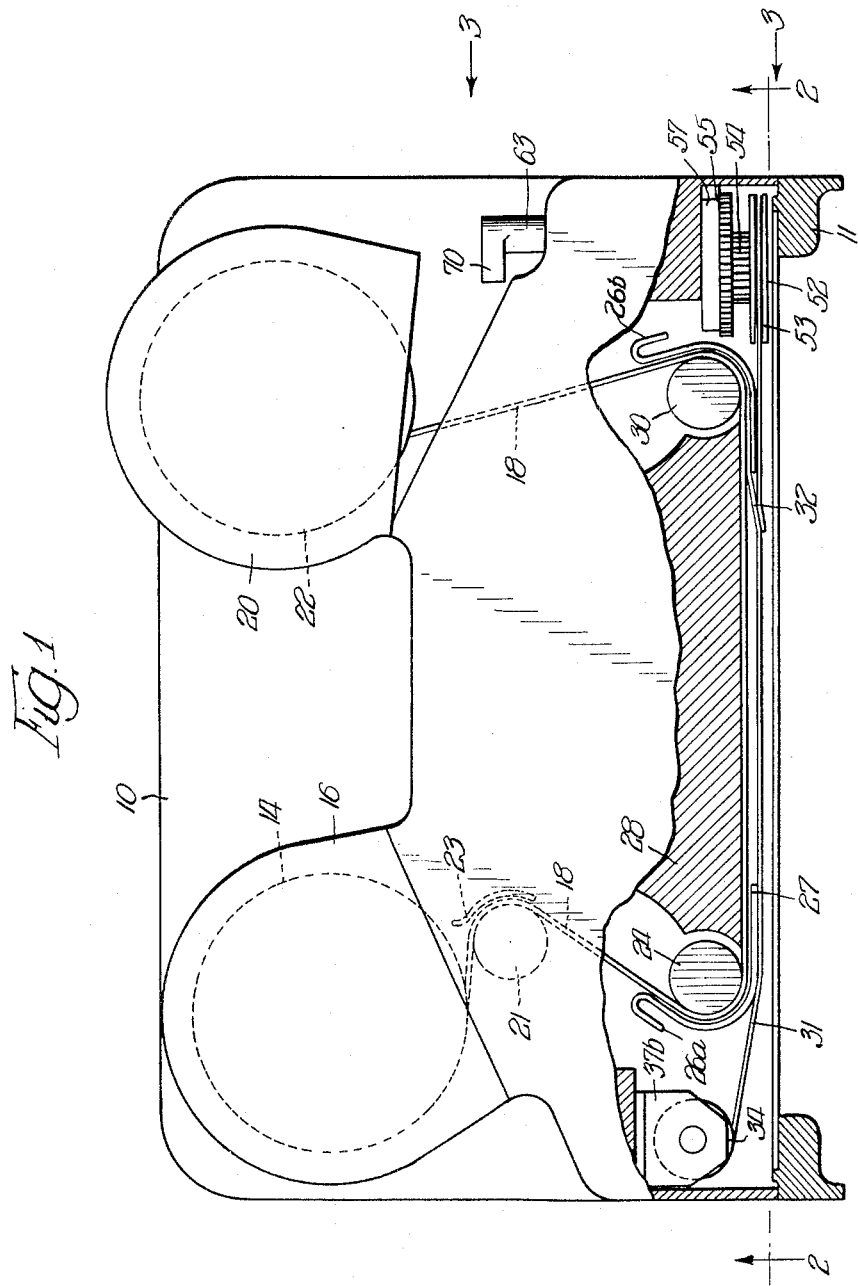
FIGURE 1 is a side view in elevation and partially in section showing a camera embodying the invention.

Referring now to the drawings, there is shown a camera body generally denoted by the numeral 10. The camera body 10 is assembled to a focal plane shutter assembly 11 which is only generally shown and which is in turn assembled to a lens cone (not shown) of any suitable type. It will be noted that the vertical dimensions of the elements and spaces included in the camera adjacent the focal plane shutter are somewhat exaggerated for purposes of clarity. As described in application Serial No. 705,317, the unexposed film is stored in the form of a spool 14 in the supply cassette 16. After the film 18 has been exposed, it is then received in the takeup cassette 20 on a spool 22. The cassette 16 is shown in its inoperative position relative to the camera body 10 whereas the cassette 20 is shown partially disassembled from the camera body and is in an operative position. The cassette 20 when in the operative position is seated on the camera body in a manner similar to that illustrated for cassette 16. The mechanism (not shown) for operating the film spools within the individual cassettes when the cassettes are assembled to the camera body 10 in their inoperative position and the assembly for mounting the spools (not shown) may be of any well-known type.

A roller 21 is rotatably mounted below the supply cassette 16 as shown in FIGURE 1. A guide bar 23 is secured adjacent to the roller 21 and is adapted to cooperate therewith to guide the film 18 around the roller 21. The film is thence guided around a roller 24 by means of an upturned ear 26a of format aperture plate 27. The film continues across the format aperture plate 27 guided between the plate and a platen 28 to another roller 30 similar to roller 24. A second upturned ear 26b of format aperture plate 27 is adapted to cooperate with the roller 30 for purposes of maintaining the film in its proper position while passing over the roller. The film is finally received in the cassette 20 and wound on the spool 22 as was mentioned previously.

When the film is being threaded between the format aperture plate 27 and the platen 28 it must pass over the format aperture 29 into which the end of the film will generally tend to drop downwardly rather than continue across toward roller 30 as desired. Consequently, it is either necessary to provide some form of film threading device or to disassemble the shutter assembly from the camera in order that the operator can guide the end of the film 18 across the format aperture 29. While the prior art devices work in those cameras having substantial clearances below the aperture 29, such is not the case with focal plane shutters where the shutter members are required to be placed as close as practicable to the aperture. In fact, in focal plane shutters the clearance between the shutter and the aperture plane is normally insufficient to accommodate the prior art types of guide means including that shown in the aforementioned application 705,317. The subject invention overcomes the problems posed by focal plane types of shutters.

The guide means includes a flat flexible guide curtain 31 and is shown in FIGURES 1 and 2 extending across the format aperture 29. As illustrated in those figures the guide curtain 31 has an enlarged tip area 32 which, when curtain 31 is fully extended, extends upwardly into the format aperture 29 to rest on the upper edge 33 thereof. Thus, as the end of the film 18 enters upon the aperture area 29, it slides upon guide curtain 31. As the end of the film continues across the aperture area 29 guided by curtain 31, the end slides up the enlarged area 32 to enter that area where it is again guided and supported by the platen 28 and the aperture plate 27. From thence, the end of the film is guided by the roller 30 and the upturned ear 26b until it finally emerges between the latter and the roller 30.

After the film has been threaded the guide curtain 31 is retracted from its operative position so as to avoid obstructing the format aperture 29. The guide curtain 31 when in the inoperative position assumes the position indicated by the phantom lines in FIGURE 2.

As shown in FIGURE 2, the curtain 31 is secured at one end to the reel assembly 34 on which the curtain is wound when in its retracted condition. The reel assembly 34 is comprised of a shaft 36 non-rotatably secured to two brackets 37a and 37b. Freely rotatable about the shaft 36 is a roller comprised of a roller shell 38 and the end bells 39 and 40 secured thereto. A helical torsion spring 41 is mounted within the roller shell 38 and is arranged to bias the roller assembly in such a manner as to move the guide curtain 31 towards its inoperative position. This is achieved by having the end 41a of the spring 41 secured to the end bell 40 and the other end 41b secured to a carrier 42 which is in turn secured to the shaft 36. The curtain is secured at its other end to a stiffening bar 35 for drawing it across the aperture plate 27 into its operative position and thus causing it to unwind from the reel assembly 34. Secured to the stiffening bar 35 near each of its outward terminations are the two ends of a cable 50. As best shown in FIGURE 2 the cable 50 extends from the stiffening bar around two freely rotatable idler sheaves 51 and 52 and through the drive sheave 53. From the drawing it is apparent that the rotation of the drive sheave 53 is converted into linear motion and transferred by means of the cable 50 to the stiffening bar 35 so as to effect linear movement of the curtain 31 between its operative or aperture blocking position and its inoperative or aperture clearing position. In moving between its operative and inoperative positions the curtain winds and unwinds from the reel assembly 34. As can be seen in FIGURE 2 the pull of the cable exerts a moment on the stiffening bar whereby the tip 32 of the curtain is deflected upwardly through the format opening when the curtain is moved from the inoperative to the operative position.

The movement of the drive sheave 53 is accomplished by means of a pinion gear 54 secured thereto. The pinion gear 54 is in turn secured to the shaft 56 which is rotatably mounted in the support plate 57. The support plate 57 is in turn secured in any suitable manner to the camera body 10. The pinion gear 54 is in mesh with the gear 55 which is in turn secured to one end of a shaft 58. FIGURE 3 illustrates a preferred method for mounting the shaft 58. A housing 59, advantageously an extended web of the camera body 10, is provided with a bore 60 which receives the shaft 58. An enlarged diameter 61 of the shaft 58 cooperates with the bore 60 and the support plate 57 to resiliently confine a compression spring 62 within the bore. Secured to the top of the shaft 58 is a handle 63.

Secured to the gear 55 is a pin 64 extending towards the support plate 57. The support plate 57 has two apertures 65 and 66 into which the pin 64 extends when the guide curtain 31 is respectively in its operative and inoperative positions. An annular slot or groove in the plate 57 connects the apertures 65 and 66 to facilitate passage of the pin 64 between the two apertures. As can be seen in FIGURE 3, the pin 64 is biased by the action of the compression spring 62 toward entry into the apertures 65 or 66. Thus, when it is desired to move the guide curtain 31 either from its inoperative position to its operative position or vice-versa, the handle 63 is pressed downwardly against the force of the spring 62 until the pin 64 is desengaged from the aperture 65 or 66. At this point, either the action of the roller assembly 34 will bias the guide curtain toward its inoperative position or an operator can rotate the knob 63 to move the curtain to its operative position.

The handle 63 is provided with a projection 70 which extends between the cassette 20 and the camera body 10 when the guide curtain 31 is in its operative or aperture blocking position, as can be seen in FIGURE 1. Because of this projection 70, the cassette 20 cannot be assembled into an operative position as long as the guide curtain 31 is obstructing the format aperture 29. Accordingly, the cassette cannot engage its operating mechanism, thus eliminating the possibility of exposing the film through the format aperture as a result of an attempt to take a photograph when the guide curtain is blocking the format aperture.

In a preferred embodiment, the curtain 31 has been constructed of a thin polyester film of the type known commercially as "Mylar." It has been found advantageous to maintain the polyester film thickness at 0.005 inch although other thicknesses and materials could be employed without departing from the spirit of the invention. With the curtain 31 constructed of a polyester film and the stiffening bar 35 manufactured from stainless steel strip, it has been found feasible to secure the strip to the curtain with synthetic rubber base cements although polyester base cements have also been successfully employed. The cable 50 in the embodiments thus far constructed has been a multiple strand stainless steel cable having an outside diameter of 0.015 inch manufactured from seven strands each having a thickness of .004 inch. While this thickness has been employed, even smaller diameters are preferred and would be used if commercially available. It has been found practicable to secure the cable 50 to stiffening bar 35 by means of cements employing epoxy resin.

The specific example of the invention herein shown and described is illustrative only. Various changes in structure will, no doubt, occur to those skilled in the art; and these changes are to be understood as forming part of this invention insofar as they fall within the spirit and scope of the appended claims.

What is claimed:

1. In a photographic device including film supply and takeup cassettes, a platen and a format aperture plate disposed between said cassettes, and a mechanism normally operable to effect transfer of photographic film from said supply cassette to said takeup cassette over a path passing between said platen and said format aperture plate, the combination with said photographic device of a means for threading film, said means for threading film comprising a flexible strip means extending across said format aperture plate when in operative position, reel means secured to said flexible strip means at one end thereof for winding said flexible strip onto when said flexible strip is in an inoperative position, and spring means cooperatively associated with said reel means for biasing said flexible strip toward its inoperative position.

2. In a photographic device including film supply and takeup cassettes, a platen and a format aperture plate disposed between said cassettes, and a mechanism normally operable to effect transfer of photographic film from said supply cassette to said takeup cassette over a path passing between said platen and said format aperture plate, the combination with said photographic device of a means for threading film, said means for threading film comprising a spring biased reel, a flexible guide curtain means having one end secured to said reel, said guide curtain means extending from said reel across said format aperture plate when in operative position and wound about said reel when in an inoperative position, and means connected to said guide curtain means for moving said guide curtain means to its operative position and rendering said takeup cassette inoperative when said flexible strip means is in its operative position.

3. In a cassette type of photographic device including film supply and takeup cassettes, a platen disposed between said cassettes, a format aperture plate aligned with said platen and having an aperture across which the film passes when being exposed, and a focal plane shutter optically aligned with said aperture for selectively permitting the passage of light to said film, the combination with said cassette type of photographic device of a means for threading film, said means for threading film comprising guide curtain means extending across said aperture for guiding said film across said aperture, reel means secured to said guide curtain means at one end thereof for winding said guide curtain thereon into an inoperative position, spring means cooperatively associated with said reel means for biasing said guide curtain means toward its inoperative position, means connected to said guide curtain means for rendering said takeup cassette inoperative when said guide curtain means is in its operative position, and means for releasably holding said guide curtain means in its operative position.

4. In a photographic device the combination comprising a format aperture plate having an aperture across which a film strip travels for the purpose of exposing successive increments thereof, a flexible strip having an enlarged tip area, reel means for storing said flexible strip when in its inoperative position, spring means for biasing said flexible strip into its inoperative position, and means for extending said flexible strip from said reel means into bridging relationship between opposing sides of said aperture with the leading edge of said tip area extending upwardly into said format aperture to rest upon the upper edge of said aperture plate whereby the end portion of said film strip may be supported as it passes over said aperture.

References Cited by the Examiner
UNITED STATES PATENTS

| | | | |
|---|---|---|---|
| 1,631,301 | 6/27 | Washington | 242—71 X |
| 3,049,981 | 8/62 | Elliott et al. | 88—17 X |

FOREIGN PATENTS

| | | |
|---|---|---|
| 914,295 | 6/46 | France. |
| 1,232,621 | 4/60 | France. |

MERVIN STEIN, *Primary Examiner.*

HARRISON R. MOSELEY, RUSSELL C. MADER,
*Examiners.*